(12) United States Patent
Meier

(10) Patent No.: US 6,543,134 B2
(45) Date of Patent: Apr. 8, 2003

(54) METHOD FOR RECONDITIONING BLADES

(75) Inventor: Reinhold Meier, Dorfen (DE)

(73) Assignee: MTU Aero Engines GmbH, Munich (DE)

(*) Notice: Subject to any disclaimer, the term of this patent is extended or adjusted under 35 U.S.C. 154(b) by 0 days.

(21) Appl. No.: 09/987,006

(22) Filed: Nov. 13, 2001

(65) Prior Publication Data
US 2002/0091459 A1 Jul. 11, 2002

(30) Foreign Application Priority Data
Nov. 10, 2000 (DE) .......................... 100 55 505

(51) Int. Cl.[7] .................................. B23P 15/00
(52) U.S. Cl. ................. 29/889.1; 29/889.7; 29/889.72; 29/402.18
(58) Field of Search ............... 29/889.1, 889.7, 29/889.72, 402.04, 402.05, 402.06, 402.08, 402.09, 402.1, 402.18, 557, 407.01, 407.05

(56) References Cited
U.S. PATENT DOCUMENTS 5,479,704 A * 1/1996 Richter et al. .............. 228/119
5,701,669 A * 12/1997 Meier ......................... 29/281.6
5,968,299 A * 10/1999 Meier et al. ................ 156/155
6,299,953 B1 * 10/2001 Meier et al. ................ 264/139

* cited by examiner

Primary Examiner—I Cuda-Rosenbaum
(74) Attorney, Agent, or Firm—Crowell & Moring LLP

(57) ABSTRACT

A method is disclosed for reconditioning blades for turbomachinery that have a material deficiency resulting from wear and tear, damage, or dimensions that are smaller than specified, in which material is removed, at least from parts of the blade, and is replaced with new material. The actual geometry of the blade is measured at certain specific points and is stored. The desired geometry, or the desired profile in its desired position, is determined via data processing technology. The desired geometry is compared with the actual geometry, and in cases of significant deviations in position, is adjusted to coincide with the actual geometry. The adjusted desired geometry is mathematically reduced by a defined amount of coating to be removed. The calculated net geometry is actually produced via the removal of material, at least over part of the blade, and new material is applied to the finished net geometry, until the desired profile is achieved.

16 Claims, 3 Drawing Sheets

METHOD FOR RECONDITIONING BLADES

BACKGROUND AND SUMMARY OF THE INVENTION

This application claims the priority of German Patent Document 100 55 505.5, filed Nov. 10, 2000, the disclosure of which is expressly incorporated by reference herein.

The invention relates to a method for reconditioning axial-construction blades for stages of turbo-machinery that have a material deficiency resulting from wear and tear, damage, and/or dimensions that are smaller than specified, especially blades for gas turbines for which the protective surface coating is worn or damaged, in which the protective coating and/or blade material is removed over at least most of the blade, and is replaced with new blade material and/or a new protective coating.

Blades for turbo-machinery are, to some extent, complex components requiring a series of manufacturing steps, and are most frequently comprised of high-grade materials, which is manifested in high component costs or a high component value. The type of blades used in the example here are single-crystal turbine blades for gas turbine rotors, made of a nickel-based alloy and equipped with ventilated enclosures. In cases of wear and tear or lower levels of damage, repairing the blades can clearly be more economical than replacing them. Frequently, such blades are equipped with special protective coatings against mechanical abrasion, against hot-gas corrosion, or against extreme temperatures. When wear and tear or damage to the protective coating occurs, attempts are made to repair them, wherein the remains of the protective coating still present must be completely removed, if possible. This is difficult because such coatings are most often ceramic, and thus are mechanically, thermally, and chemically highly resistant. Furthermore, the coating material diffuses into the blade material, creating a very deep, firm connection that is very difficult to dissolve. As a rule, when the remaining portions of the protective coating are removed, blade material will also come off.

Currently, in the removal of coatings from blades, it is customary to combine chemical treatment steps with mechanical treatment steps, wherein the action of an acid or lye causes the structure of the coating to break up, after which material is removed, for example, via mechanical radiation. As a rule it is necessary to repeat this series of steps several times. This method of removing the coating is associated with several serious disadvantages. It is environmentally problematic in terms of its chemical side, it is time-, material-, and cost-intensive, due especially to the multiple changes between different types of processing steps, and it frequently leads to an uneven removal of material over the surface of the blade, that is, it varies in spots. This can result in an undesirable change in the shape of the blade, and thus in its aerodynamics, and a reduction in the stability of the component resulting from the unnecessary removal of blade material. As a rule, these deficiencies cannot be compensated for with the newly applied coating, or can be compensated for to a limited extent.

Attempts are also made to remove the remaining sections of protective coating and surface damage from blades by milling, if desired in combination with a subsequent grinding by hand, or using hand-operated sanding devices. This also carries with it the danger, particularly with grinding, that too much of the blade material will be removed, thus adulterating the shape of the blade.

In contrast to this, the present invention provides a method for reconditioning axial-construction blades for stages of turbo-machinery that have a material deficiency caused by wear and tear, damage, and/or dimensions that are smaller than specified, which will enable the reliable removal of damaged surface areas, and damaged protective coatings, while protecting the component itself, in a time- and cost-efficient manner, while ensuring a problem-free and optimum application of a new coating with the highest degree of profile precision.

In accordance with the invention, the actual geometry of the blade is measured, the desired geometry is determined via data processing, the desired profiles are laid over the actual profiles as accurately as possible, and an adjusted desired geometry is calculated; the adjusted desired geometry is mathematically reduced by a defined removal of the coating to a net geometry that lies within the blade material, and the net geometry is produced at least in areas of the blade by removing material, and applying new material where the material was removed. Used blades frequently exhibit deviations in their profile from the desired profile, in other words the profile center no longer lies along the axis of the shaft, or the setting angle for the profile is somewhat too large or too small, for example. This results from permanent deformations in the frequently very hot working medium (gas, steam). The invention takes this circumstance into account, in that it assigns greater importance to the profile accuracy/the desired profile than the desired position. This is reflected in the shape of the adjusted desired geometry. If a blade that is to be repaired shows no deviation in the position of its profile, over the whole blade, an adjusted desired geometry is not necessary. The net geometry can then be calculated and prepared directly from the "absolute" desired geometry. This is seldom the case, however. The coating removal calculated from the adjusted desired geometry—or the "absolute" desired geometry—and the actual application of the new material should be equal in terms of their thickness or distribution, in order to achieve the desired profile. It is also possible to exceed the desired profile thickness slightly, in order to provide a certain "wear and tear reserve".

BRIEF DESCRIPTION OF THE DRAWINGS

The invention will be described in even greater detail with the help of the figures. These show, in illustrations that are not true to scale.

DETAILED DESCRIPTION OF THE DRAWINGS

Figure 1:
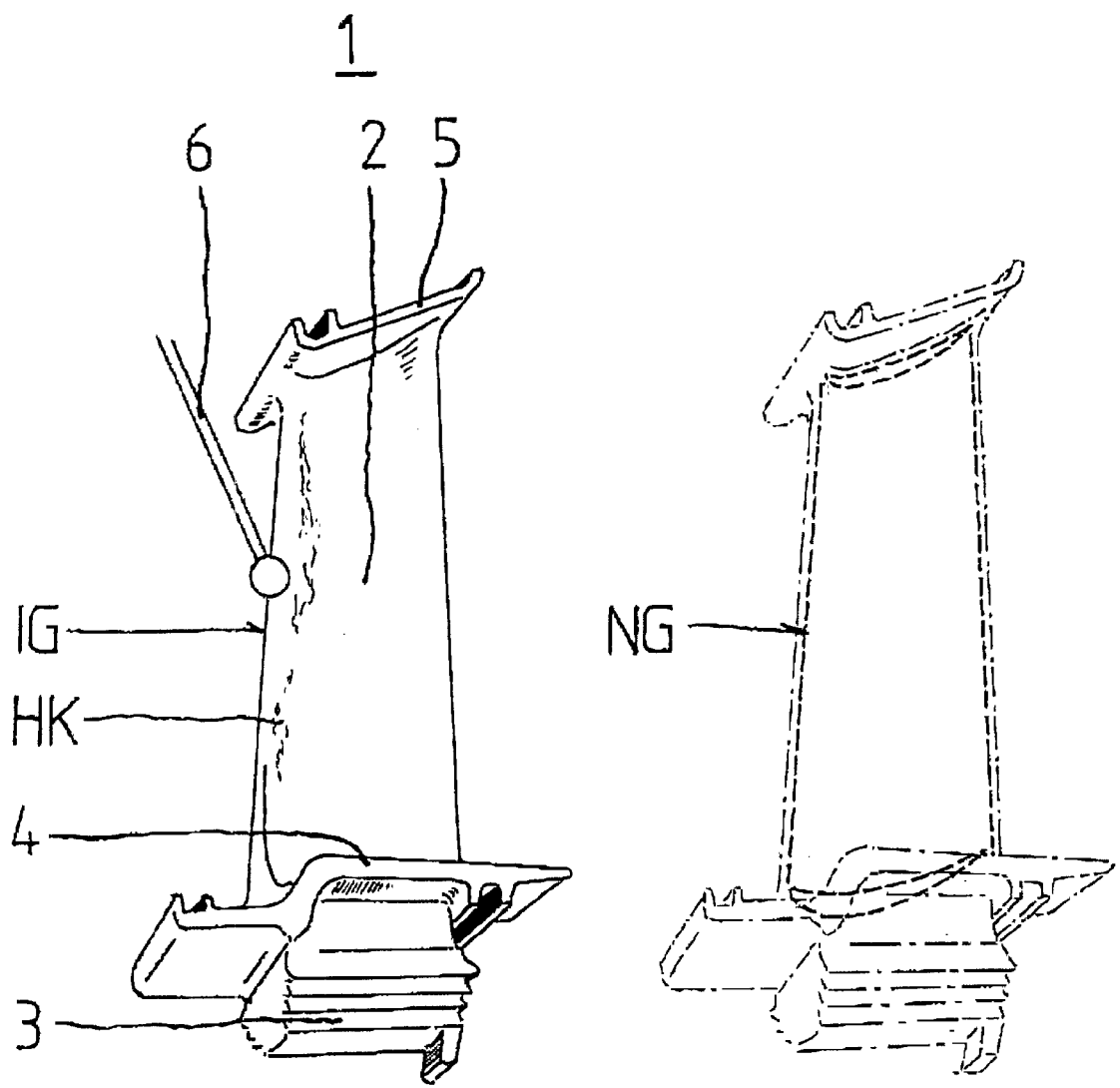
FIG. 1 is a perspective view of a blade that has been damaged by hot-gas corrosion, with a blade profile shown in cross-section.

The blade 1 shown in FIG. 1 represents a rotating turbine blade from a gas turbine machine. The contoured blade face 2, a platform 4 that forms a radial, inner wall of a flow channel, a cover band 5 that forms the radial, outer wall of the flow channel, and the contoured, pine-tree-shaped blade base 3. Further, a sensor 6 is indicated, which is used to determine the actual geometry IG of the blade. The blade 1 is shown with some damage caused by hot-gas corrosion HK, on the thrust face in the upward flow area. See also the actual profile IP, shown hatched, below the figure. To repair the damaged areas, in other words to repair the blade 1, in the present case a defined removal of the coating over the entire blade face 2 is to take place, to which end a net geometry NG that lies within the actual geometry IG—at least to the greatest extent possible—is determined mathematically. Further details in this regard are provided in the discussion of FIG. 4.

Figure 2:
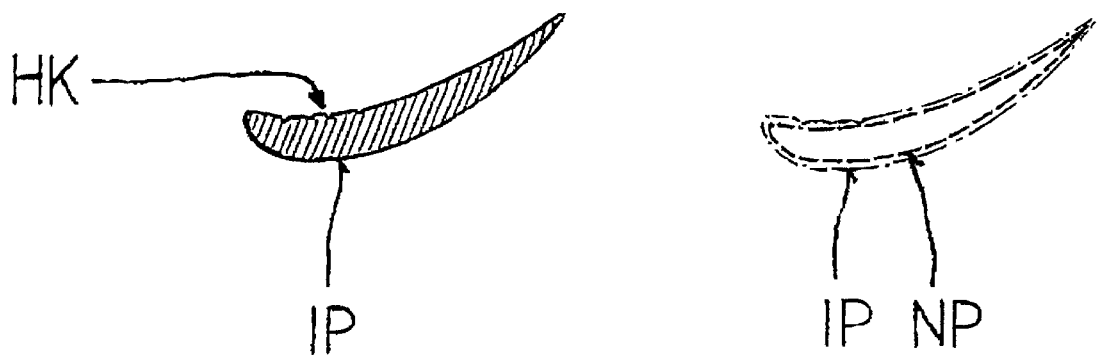
FIG. 2 is a view that can be compared with FIG. 1 of a blade profile, designed to illustrate the net geometry, which is shown inside the actual geometry.

In FIG. 2, the entire actual geometry IG of the blade 1 is indicated with a dot-dashed line, while the net geometry NG calculated for the blade area is indicated with a larger-scale dashed line. Also in the lower profile section, it can be seen that the calculated net profile NP lies within the actual profile IP, that is, within the blade material.

Figure 3:
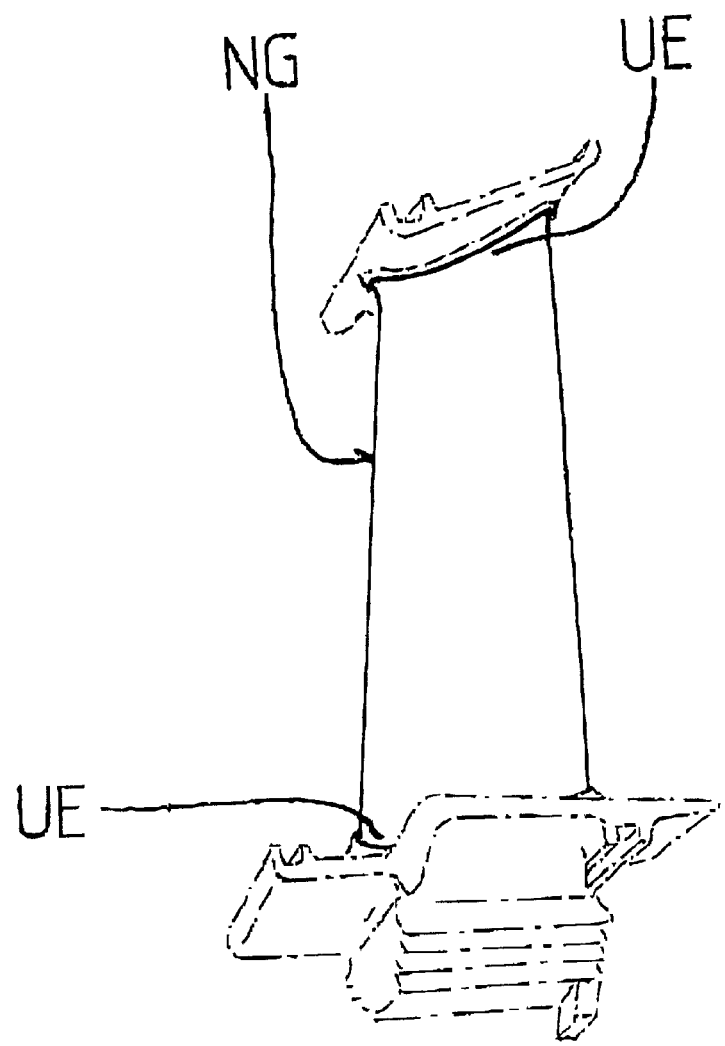
FIG. 3 is a view that can be compared with FIGS. 1 and 2 of a blade profile, designed to illustrate the finished, net geometry.
Figure 3:
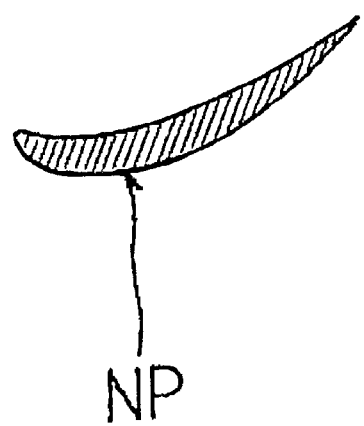

FIG. 3 shows the actual net geometry NG produced via the removal of material, in thicker, solid lines, while the areas of the blade 1 not affected by the removal are shown with thinner, dotted-dashed lines. The crossovers UE from the net geometry NG to the adjacent blade areas are rounded in a defined manner, in order to prevent notching. The lower profile section in the figure shows only the actual net profile NP, hatched.

The removal of material may involve a cutting process, via grinding and/or sanding, or a non-cutting process, preferably via a so-called laser-caving process. The selected method will also depend upon whether or not the blade is equipped with a protective coating. The principle of the invention remains unaffected by this. The subsequent, necessary application of blade material or a new protective coating to the actual net geometry NG will be clear to an expert in the field, and is thus not specifically discussed here. The methods used to implement this, such as flame-spraying, laser-powder-weld resurfacing, electroplating, soldering, etc., are known-in-the-art.

Figure 4:
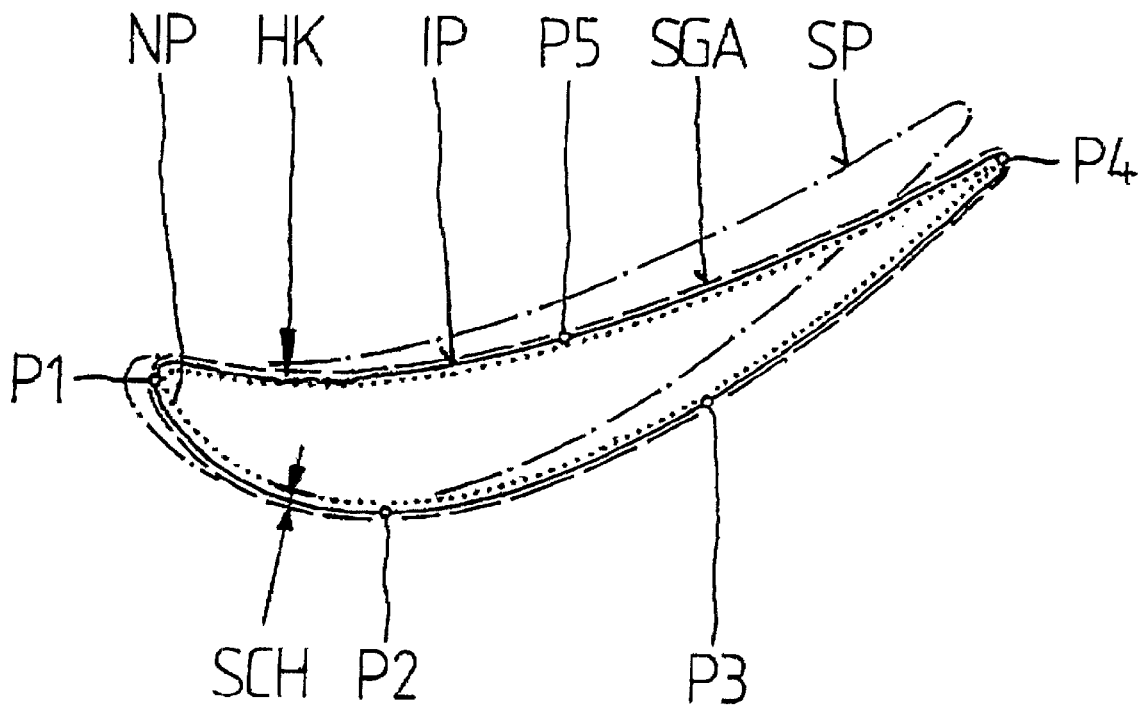
FIG. 4 is a cross-section of a blade profile with the actual profile, the desired profile in its desired position, the desired profile in an adjusted position, and the net profile.

In FIG. 4, the process specified in the invention is further shown. The diagram shows an axial section that extends crosswise to the radial longitudinal direction of the blade face 2, wherein the local blade profile, effective in terms of fluid mechanics, is shown in its true shape. The solid line corresponds to the actual profile IP of the used blade 1 that is to be repaired. In this case also, damage caused by hot-gas corrosion HK, with an irregular material deficiency, is indicated on the thrust face in the upward flow area. The actual profile IP is measured in selected areas, that is, at points, indicated here by the points P1 through P5, and the information is stored in a data processing system. The measured points are selected specifically at positions in which, in keeping with past experience, no relevant surface damage has occurred. If, for instance, several measuring points were to lie in corroded, depressed areas, a false image of the shape and position of the actual profile IP could result. Nevertheless, it would make sense to determine via measurement techniques the maximum depth of the damaged areas present, perpendicular to the surface of the blade, in order to adjust the later application of the coating accordingly. The local desired profile SP in its desired position is indicated here by a dot-dashed line, with a deviation in position from the actual profile IP that in this case is shown greater than it actually would be, for purposes of clarity. In this case, the desired profile SP, in its desired position, is located with nearly its entire concave thrust face outside of the actual profile IP. The same is true for its leading edge, upward of flow at P1, and for its trailing edge near P4.

Clearly, it would make no sense to transform the actual profile IP into the desired profile SP in its desired position. This would require the removal of an inordinately large amount of blade material from the intake side, and the application of material to the thrust side. The process specified in the invention is thus different. The desired profile SP is mathematically shifted and/or rotated out of its desired position until its position coincides to the greatest degree possible with the position prescribed by the actual profile points P1 through P5. This adjusted position for the desired profile is indicated here by a dashed line, with the abbreviation SGA standing for adjusted desired geometry. In operations involving high temperatures and high mechanical loads, permanent deformations of the blades frequently occur, as a result of bending and rotation, among other factors. In the case of rotating blades, the deformations also normally increase with the increasing radial distance from the base of the blade. Thus it may occur that the actual position of the blade profile near the inner platform still coincides with the desired position, while it clearly deviates from the desired position near the tip of the blade or at the center area of the blade. In keeping with the invention, the desired profile SP is naturally only shifted out of its desired position, in other words adjusted, when a significant deviation from the actual profile IP exists. In the figure it can be seen that in this case the desired profile SP is somewhat thicker than the actual profile IP, which can occur as a result of wear and tear on the actual profile IP. Such deviations may also occur, however, during production. The invention offers the possibility of compensating for such deviations from the desired profile SP in the framework of a repair process.

Proceeding from the adjusted position SGA, indicated here by a dashed line, the desired profile is reduced—also mathematically—on all sides by a defined removal of the coating SCH. The latter may be applied in a constant thickness or in varying thicknesses over the surface of the blade, taking into account the damaged areas in the blade face 2 that are the deepest, perpendicular to the surface of the blade. The amount of coating to be removed SCH should be large enough such that the net profile NP that this amount is used to calculate will lie within the actual profile IP to the greatest extent possible, that is, within the blade material. In this manner, areas of damage having material deficiencies can be overcome completely simply via the removal process, while an optimum flow contour is generated. This mathematical net profile NP is shown in the figure as a dotted line. As has been mentioned several times, material is removed from the blade face, at least in some areas, until this net profile NP is produced, after which it is made thicker via the addition of new material until the desired profile is produced, wherein the blade material and/or a new protective coating is applied. As has also been mentioned, the profile of a blade may also be modified via the method specified in the invention. In this case, the original desired profile for the present blade is replaced with a new, modified—within narrow limits—desired profile, and material is removed and reapplied in accordance with the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for reconditioning axial-construction blades for stages of turbo-machinery that have a material deficiency resulting from wear and tear, damage, or dimensions that are smaller than specified, in which the protective coating or blade material is removed over at least part of the blade, and is replaced with new blade material or a new protective coating, comprising:

a) determining an actual geometry of the blade via measuring techniques at defined points, and storing the actual geometry in a data processing system, b) defining a desired geometry of the blade approximately by an axial desired profile or desired cross-section, in a desired position, and storing the desired geometry in the data processing system, c) comparing the desired geometry basically along axial cutting planes with the actual geometry that has been measured at certain specific points wherein in a case of significant deviations a local desired profile is overlaid, via rotation or shifting, over a local actual profile, which has been measured at the certain specific points, calculating an adjusted desired geometry for a radial height of the blade, which is free from buckled and stepped areas, from the desired profiles that deviate from the desired positions, and from the desired profiles that may be left in the desired positions; storing the adjusted desired geometry, d) mathematically reducing the adjusted desired geometry by a defined amount of coating to be removed, until a net geometry that lies, to a greatest extent possible, or completely, within the blade material, is reached, e) producing the calculated net geometry over at least a partial area of the blade via removal of material, while generating defined, rounded crossover points to areas of the blade from which no material is to be removed, and f) applying the new blade material or the new protective coating to the finished net geometry, in a thickness that is equal to a thickness of the amount of coating that was removed, which was calculated from the adjusted desired geometry, at least to the greatest extent possible.

2. The method of claim 1, wherein the removal of material is accomplished via a cutting process, involving grinding or sanding, or via a non-cutting process involving a laser.

3. The method of claim 1, wherein establishment of the actual geometry of the blade, which was determined via the measuring techniques, and the removal of material until the net geometry is produced are performed using the same CNC processing machine.

4. The method of claim 1, wherein the mathematical removal of coating material which leads from the adjusted desired geometry to the net geometry is implemented in a thickness that either is constant over the entire surface of the blade, or varies at defined points.

5. The method of claim 4, wherein the application of coating material in the form of blade material or the new protective coating to the finished net geometry is performed, as with the mathematical removal of coating material, in either a constant or a varying thickness.

6. The method of claim 1, wherein the application of blade material or the new protective coating is implemented via electroplating, soldering, welding, slip technology, or spraying.

7. The method of claim 1, wherein the blade material is a titanium-, nickel-, or cobalt-base material.

8. The method of claim 1, wherein the protective coating is a steel plating, a hot-gas corrosion protective coating, or a heat-insulating layer.

9. The method of claim 1, wherein the defined points for determining the actual blade geometry via the measuring techniques are positioned on a surface of the blade, at points in which no significant wear and tear, or no significant damage generally occur.

10. The method of claim 1, wherein for the calculation of the adjusted desired geometry in a radial direction along a length of the blade, in an area of the blade face, a minimum bending radius is assumed.

11. A method for reconditioning an axial-construction blade, comprising:

determining an actual geometry of the blade;

storing the actual geometry in a data processing system;

defining a desired geometry of the blade;

storing the desired geometry of the blade in the data processing system;

comparing the desired geometry to the actual geometry;

calculating an adjusted desired geometry based on the step of comparing the desired geometry to the actual geometry;

mathematically reducing the adjusted desired geometry by a defined amount of a coating to be removed to determine a net geometry of the blade, wherein the net geometry of the blade lies within the actual geometry of the blade;

removing a material from an area of the blade such that a blade configuration corresponding to the net geometry of the blade is produced;

applying a new material to the blade on the area of the blade from which the material was removed, wherein the new material is applied in a thickness that is equal to a thickness of the material which was removed from the blade.

12. The method of claim 11, wherein the step of comparing the desired geometry to the actual geometry includes the step of overlaying the desired geometry over the actual geometry.

13. The method of claim 12, wherein the step of overlaying includes rotating the desired geometry with respect to the actual geometry.

14. The method of claim 12, wherein the step of overlaying includes shifting the desired geometry with respect to the actual geometry.

15. The method of claim 11 further comprising the step of generating a defined crossover point to an area of the blade from which the material is not removed when producing the net geometry of the blade.

16. The method of claim 11, wherein the step of determining the actual geometry of the blade includes the step of measuring a plurality of positions on a surface of the blade at which no damage is present on the surface of the blade.

* * * * *